United States Patent
Chou et al.

(10) Patent No.: US 8,306,948 B2
(45) Date of Patent: Nov. 6, 2012

(54) GLOBAL DEDUPLICATION FILE SYSTEM

(75) Inventors: Randy Yen-pang Chou, San Jose, CA (US); Steve Jung, San Jose, CA (US); Ravi Mulam, San Jose, CA (US)

(73) Assignee: Panzura, Inc., San Jose, CA (US)

( * ) Notice: Subject to any disclaimer, the term of this patent is extended or adjusted under 35 U.S.C. 154(b) by 149 days.

(21) Appl. No.: 12/772,933

(22) Filed: May 3, 2010

(65) Prior Publication Data

US 2011/0270800 A1 Nov. 3, 2011

(51) Int. Cl.
*G06F 17/30* (2006.01)
(52) U.S. Cl. ........ 707/610; 707/640
(58) Field of Classification Search .......... 707/610, 707/640
See application file for complete search history.

(56) References Cited

U.S. PATENT DOCUMENTS

| | | | |
|---|---|---|---|
| 2006/0184587 A1* | 8/2006 | Federwisch et al. | 707/200 |
| 2008/0028169 A1* | 1/2008 | Kaplan et al. | 711/162 |
| 2008/0109494 A1* | 5/2008 | Chitre et al. | 707/201 |
| 2009/0144343 A1* | 6/2009 | Holt et al. | 707/203 |
| 2010/0268960 A1* | 10/2010 | Moffat et al. | 713/181 |
| 2011/0119668 A1* | 5/2011 | Calder et al. | 718/1 |
| 2011/0196900 A1* | 8/2011 | Drobychev et al. | 707/812 |

* cited by examiner

*Primary Examiner* — Son T Hoang
(74) *Attorney, Agent, or Firm* — Park, Vaughan, Fleming & Dowler LLP

(57) ABSTRACT

The disclosed embodiments describe interactions and synchronization techniques for global deduplication file systems. In one embodiment of the invention, a method and system implements a global deduplication file system between a plurality of interconnected systems located in different locations globally by making use of the deduplication dictionary included in metadata being periodically snapshot. In yet another embodiment of the invention, a method implements a global deduplication file system between a plurality of interconnected systems located in different locations globally and provides appropriate read/write locks.

15 Claims, 4 Drawing Sheets

GLOBAL DEDUPLICATION FILE SYSTEM

FIELD

Embodiments of the invention relate to global deduplication, cloud storage and NAS.

BACKGROUND

Presently, the storage market and the wide area network (WAN) optimization market make use of various deduplication techniques in order to save on storage and bandwidth, respectively. In these deduplication techniques, the storage or WAN optimization receives a copy of data once and compares subsequent data to the first copy to determine whether there are similarities. These techniques are effective when multiple users are accessing and storing the same or similar data located in one central location.

For example, assuming ten users have a copy of a 1 megabyte (Mb) power point presentation. Each of the ten users makes minor changes (0.01 Mb) to the presentation and saves these updated presentations to the fileserver. Without deduplication, the fileserver would store ten copies of the original 1 Mb presentation and 0.1 Mb of minor changes to the presentation. In contrast, using deduplication, 1 Mb presentation is recognized as having previously been received so that only one copy of the 1 Mb presentation and the 0.1 Mb of minor changes to the presentation are stored. Accordingly, the storage space is optimized by not storing redundant data. Similarly, deduplication saves on bandwidth because only the data that is different is being transmitted. However, the present deduplication techniques are not effective when data is distributed across different locations and with few users accessing the data at each location.

Similarly, when the data is distributed across multiple locations and multiple people share the data, it is difficult to ensure that only one person is able to write to the data at a given time and it is also difficult to ensure that all the users are able to read the latest copy of the data. Microsoft DFS, for instance, suffers from these problems. In an attempt to overcome these problems, the current solutions involve moving all of the data to centralized locations. However, the main disadvantages of these solutions are slower access performance and an inability to deduplicate the data being accessed from multiple locations.

SUMMARY

Embodiments of methods and systems implementing global deduplication file systems are described.

According to one embodiment of the invention, a global deduplication file system between a plurality of interconnected systems located in different locations globally may be implemented by making use of the deduplication dictionary included in metadata being periodically snapshot. In this embodiment of the invention, a method of implementing a global deduplication file system between a plurality of interconnected systems including at least a first system and a second system starts by snapshotting a metadata and a data stored in the first system to the second system. A snapshot of a metadata and a data stored in the second system is also received at the first system. A first deduplication dictionary stored in the first system, which identifies data stored in each of the plurality of interconnected systems, is updated to reflect a deduplication dictionary included in the snapshot of the metadata stored in second system. The incremental metadata stored in the first system is then periodically snapshot to the second system. The first system also receives a snapshot of incremental metadata stored in the second system. The first deduplication dictionary is further updated to reflect the deduplication dictionary included in the snapshot of the incremental metadata stored in the second system. In this embodiment, additional data is uploaded to the first system. Based on the first deduplication dictionary, it is determined whether the second system does not include a portion of additional data. The portion of additional data is snapshot from the first system to the second system if the second system is determined not to include the portion of additional data. In other embodiments, the snapshots of data may be uploaded to "cloud storage," namely network-shared resource storage, and downloaded therefrom.

According to another embodiment of the invention, a system implementing a global deduplication file system may comprise a plurality of interconnected systems located in different locations globally. Each of the plurality of interconnected systems may include a fileserver, a deduplication dictionary storage, a snapshot logic, a compare logic and a transmission logic. The fileserver stores a metadata and data while the deduplication dictionary storage stores a deduplication dictionary that identifies data being stored in each of the plurality of interconnected systems. Further, the snapshot logic is implemented to snapshot the metadata and the data stored in the fileserver. The compare logic determines based on the deduplication dictionary whether the data stored in one of the other plurality of interconnected systems includes a portion of additional data. The transmission logic may periodically transmit an incremental snapshot of the metadata to each of the other plurality of interconnected systems and may also transmit a snapshot of the portion of additional data to the one of other plurality of interconnected systems if the compare logic determines that the one of other plurality of interconnected systems does not include the portion of additional data.

In yet another embodiment of the invention, a global deduplication file system may be implemented that provides for the appropriate read/write locks. In this embodiment, the method of implementing a global deduplication file system between a plurality of interconnected systems located in different locations globally and including at least a first system and a second system, starts by snapshotting a metadata and a data stored in the first system to the second system. A snapshot of a metadata and a data stored in the second system is also received by the first system. The first deduplication dictionary stored in the first system, which identifies data stored in each of the plurality of interconnected systems, is updated to reflect a deduplication dictionary included in the snapshot of the metadata stored in second system. Incremental metadata stored in the first system is periodically snapshot to the second system. The first system also periodically receives a snapshot of incremental metadata stored in the second system. The first deduplication dictionary is further updated to reflect the deduplication dictionary included in the snapshot of the incremental metadata stored in the second system. In this embodiment, the first system determines whether data stored in the second system is being accessed. If the data stored in the second system is not being accessed, the data stored in the second system is linked into data stored on a shadow system that is stored in the first system and a metadata link is then created from the data stored on the second system to the data stored on the shadow second system. The data stored on the shadow system may then be edited and the edited data may be saved onto the shadow system. When the data stored in the second system is accessed, the data and metadata stored in the first system may be snapshot to the second system.

The above summary does not include an exhaustive list of all aspects or embodiments of the present invention. It is contemplated that the invention includes all systems and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

Herein, the terms "logic" and "module" are generally defined as hardware and/or software configured to perform one or more functions. However, the logic is a component of a module. For instance, the logic may be software or one or more integrated circuits, semiconductor devices, circuit boards, combinatorial logic or the like. A module may be any networking equipment (e.g., router, bridge, brouter, etc.), an integrated circuit or server, personal computer, main frame, or software executed therein.

"Software" is generally describes as a series of operations that are performed by executing preloaded instructions or executing instructions provided by an application, an applet, or even a routine. The software may be executed by any processing device including, but not limited or restricted to a microprocessor, a digital signal processor, an application specific integrated circuit, a microcontroller, a state machine, or any type of programmable logic array. The software may be stored in any type of machine readable medium such as a programmable electronic circuit, a semiconductor memory device such as volatile memory (e.g., random access memory, etc.) and/or non-volatile memory such as any type of read-only memory (ROM) or flash memory, a portable storage medium (e.g., hard drive, optical disc drive, digital tape drive), or the like.

The following description is the divided into three parts. Part I describes systems for implementing a global deduplication file system. Part II describes methods for implementing a global deduplication file system that allows data coming in and out of the system to be deduplicated on a global basis. Part III describes methods for implementing a global deduplication file system that provides appropriate read/write locks.

Part I: Systems for Implementing a Global Deduplication File System.

Figure 1A:
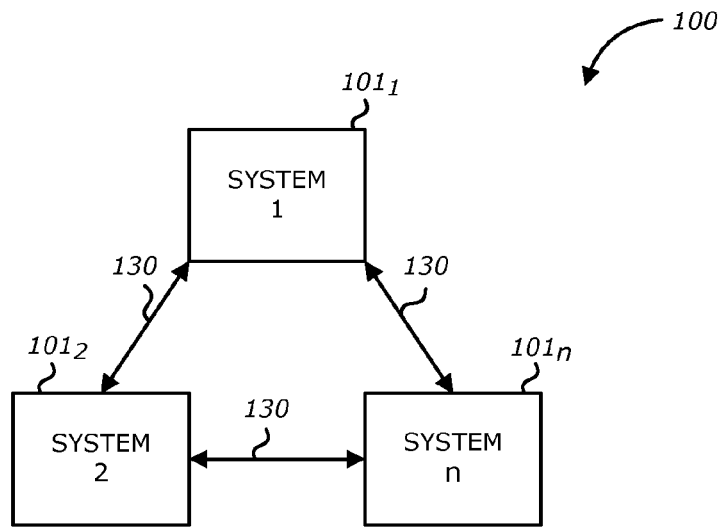
FIG. 1A is an exemplary block diagram of a system in which one embodiment of the invention may be implemented.

FIG. 1A shows an exemplary block diagram of a system in which an embodiment of the invention may be implemented. System 100 implementing a global deduplication file system comprises a plurality of interconnected systems $101_1$-$101_N$ (where $N \geq 1$). In one embodiment, the systems $101_1$-$101_N$ may be interconnected in a star configuration. The plurality of interconnected systems $101_1$-$101_N$ are located in different global locations. For example, system $101_1$ may be located in New York and system $101_2$ may be located in Tokyo. The plurality of interconnected systems $101_1$-$101_N$ are interconnected via a transmission mediums 130 which operate as communication pathways for metadata and data. The transmission mediums 130 may include, but are not limited to electrical wires, optical fiber, cable, a wireless link established by wireless signaling circuitry, or the like.

Figure 1B:
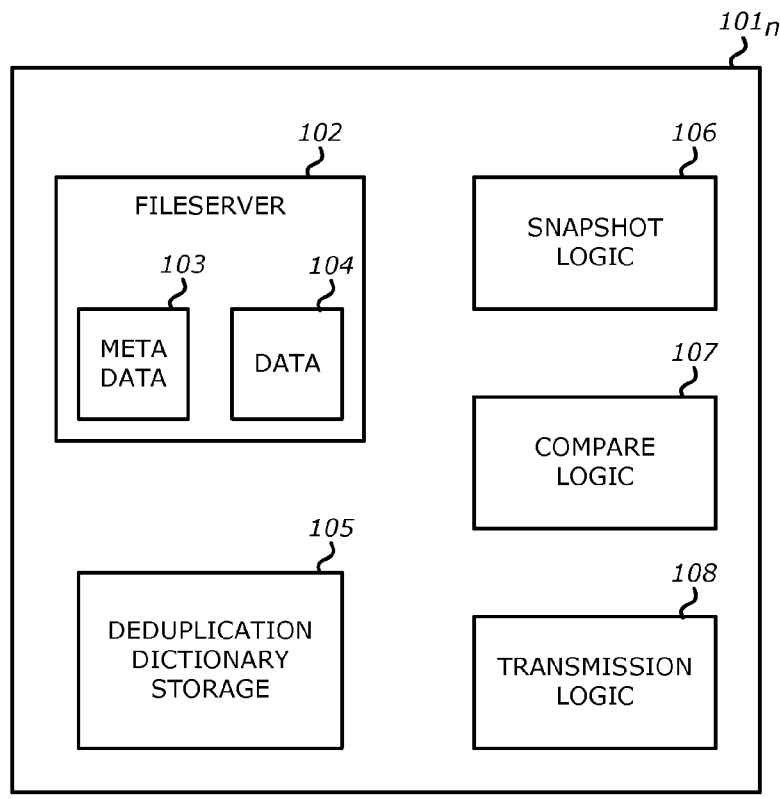
FIG. 1B is an exemplary block diagram of one of the plurality of interconnected systems from the system in FIG. 1A in which one embodiment of the invention may be implemented.

FIG. 1B shows an exemplary block diagram of one of the plurality of the interconnected systems $101_1$-$101_N$ from FIG. 1A in which one embodiment of the invention may be implemented. In this embodiment, each of the plurality of interconnected systems $101_N$ may include a fileserver 102, a deduplication dictionary storage 105, a snapshot logic 106, a compare logic 107 and a transmission logic 108.

The fileserver 102 stores a metadata 103 and data 104. In some embodiments, a ZFS file system may be used for creating a distributed file system although it is contemplated that other file systems may be used in lieu of ZFS. In these embodiments, the file server 102 included in the system $101_1$ is a ZFS file system in which the system $101_1$ is a lock owner. Lock owner is defined as the system that owns all write ownership to the data. The metadata 103 may include information such as the file, the directory, the deduplication dictionary, and the lock ownership of each file. The metadata 103 may be stored in one vdev included in the ZFS file system while the data 104 may be stored in separate vdev included in the ZFS file system. All clients would have access to the data 104 stored in each plurality of interconnected systems $101_1$-$101_N$ upon connecting to one of the systems $101_N$.

In one embodiment, the deduplication dictionary storage 105 is implemented to store the deduplication dictionary. The deduplication dictionary contains a plurality of hash values that identify data being stored in each of the plurality of interconnected systems. In other words, the deduplication dictionary may be used as a hash lookup table to ascertain whether a given data is stored at one of the plurality of interconnected systems $101_1$-$101_N$.

The snapshot logic 106 is configured to snapshot the metadata 103 and the data 104 stored in the fileserver 102. In one embodiment, the snapshot is a copy of the state of the metadata 103 and data 104 at the time which the snapshot was taken. For example, if at time 0, the snapshot logic 106 snapshots metadata 103 and data 104 stored in system $101_1$ to system $101_2$, a copy of the metadata 103 and data 104 found at time 0 in fileserver 102 of system $101_1$ is sent from the system $101_1$ to the system $101_2$.

The compare logic 107 is configured to determine based on the deduplication dictionary stored in the deduplication dictionary 105 whether the data 104 stored in one of the other plurality of interconnected systems $101_1$-$101_2$ includes a portion of additional data. The transmission logic 108 may periodically transmit an incremental snapshot of the metadata to each of the other plurality of interconnected systems. An incremental snapshot provides only the differences from the previous snapshot. For example, at time 0, the metadata contains (x) and at time 1, the metadata contains (x+y), the incremental snapshot provided at time 1 includes (y) only. The transmission logic 108 may also transmit a snapshot of a portion of additional data. For instance, if the compare logic 107 included in system $101_1$ determines that system $101_2$ does not include a portion of additional data that has been uploaded, the transmission logic 108 transmits a snapshot of that portion of additional data to system $101_2$. In this manner, no data that has been previously transmitted to system $101_2$ is retransmitted.

Figure 2:
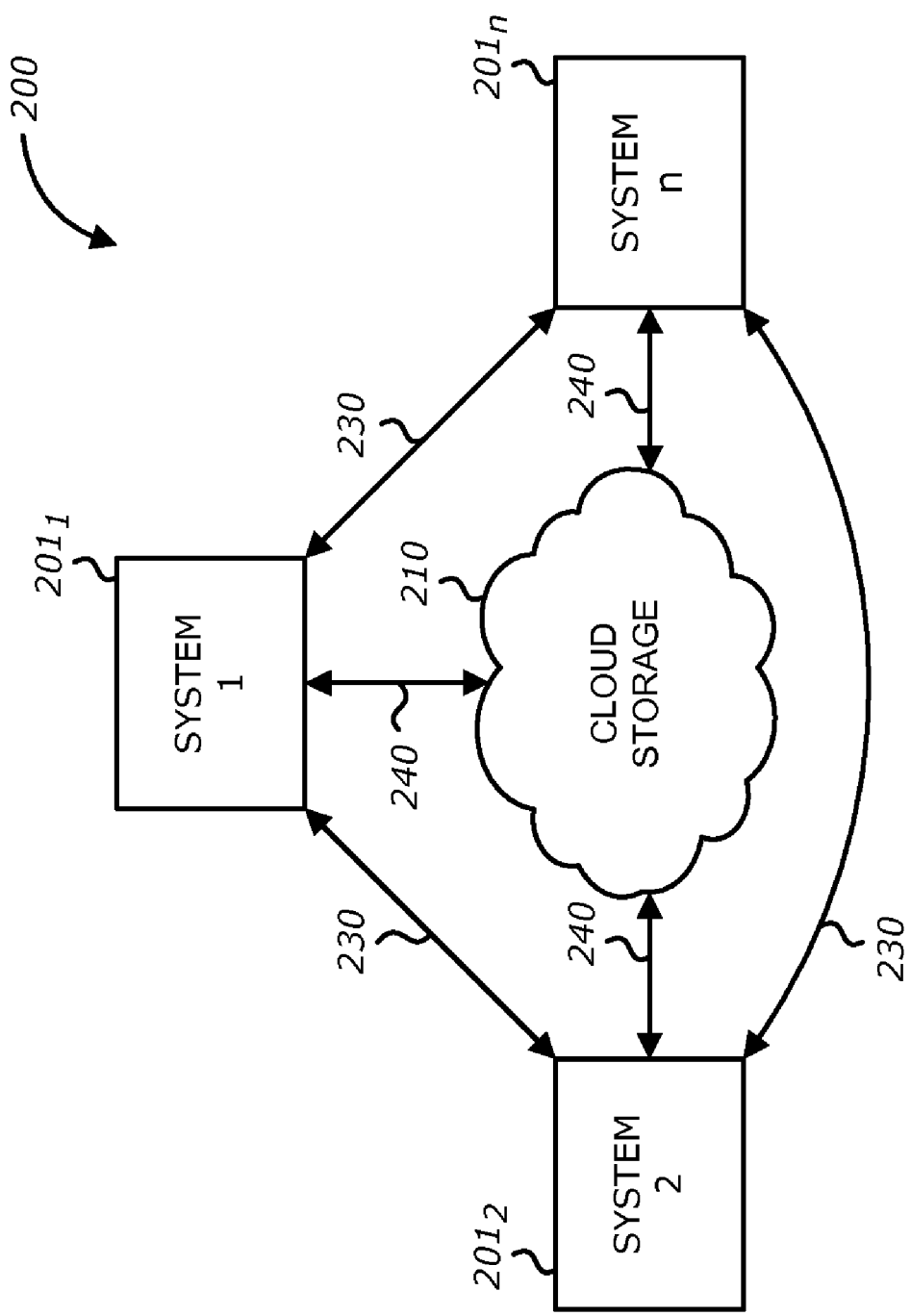
FIG. 2 is an exemplary block diagram of a system in which another embodiment of the invention may be implemented.

FIG. 2 shows an exemplary block diagram of a system 200 in which another embodiment of the invention may be implemented. Similar to system 100, system 200 implements a global deduplication file system and comprises a plurality of interconnected systems $201_1$-$201_N$ (where N≧1) via transmission mediums 230. However, in this embodiment, the transmission mediums 230 operate as communication pathways for metadata only. Each of the plurality of interconnected systems $201_1$-$201_N$ is also connected to a cloud storage provider 210 via transmission mediums 240. The transmission mediums 240 operate as communication pathways for data. The transmission mediums 230 and 240 may include, but are not limited to electrical wires, optical fiber, cable, a wireless link established by wireless signaling circuitry, or the like.

Accordingly, in one embodiment, the snapshot logic in each of the plurality of systems $201_1$-$201_N$ snapshots metadata to other systems $201_1$-$201_N$ via transmission mediums 230 and snapshots data to the cloud storage provider 210. By allowing the systems $201_1 201_N$ to download the data from the cloud storage provider 210, system 200 may provide higher performance and disaster recovery (DR). In other words, using this configuration, no data that has been previously uploaded to the cloud storage provider 210 is retransmitted.
Part II: Methods for Implementing a Global Deduplication File System that Allows Data Coming in and Out of the System to be Deduplicated on a Global Basis.

In one embodiment, a global deduplication file system between a plurality of interconnected systems located in different locations globally may be implemented by making use of the deduplication dictionary included in metadata being periodically snapshot.

Figure 3:
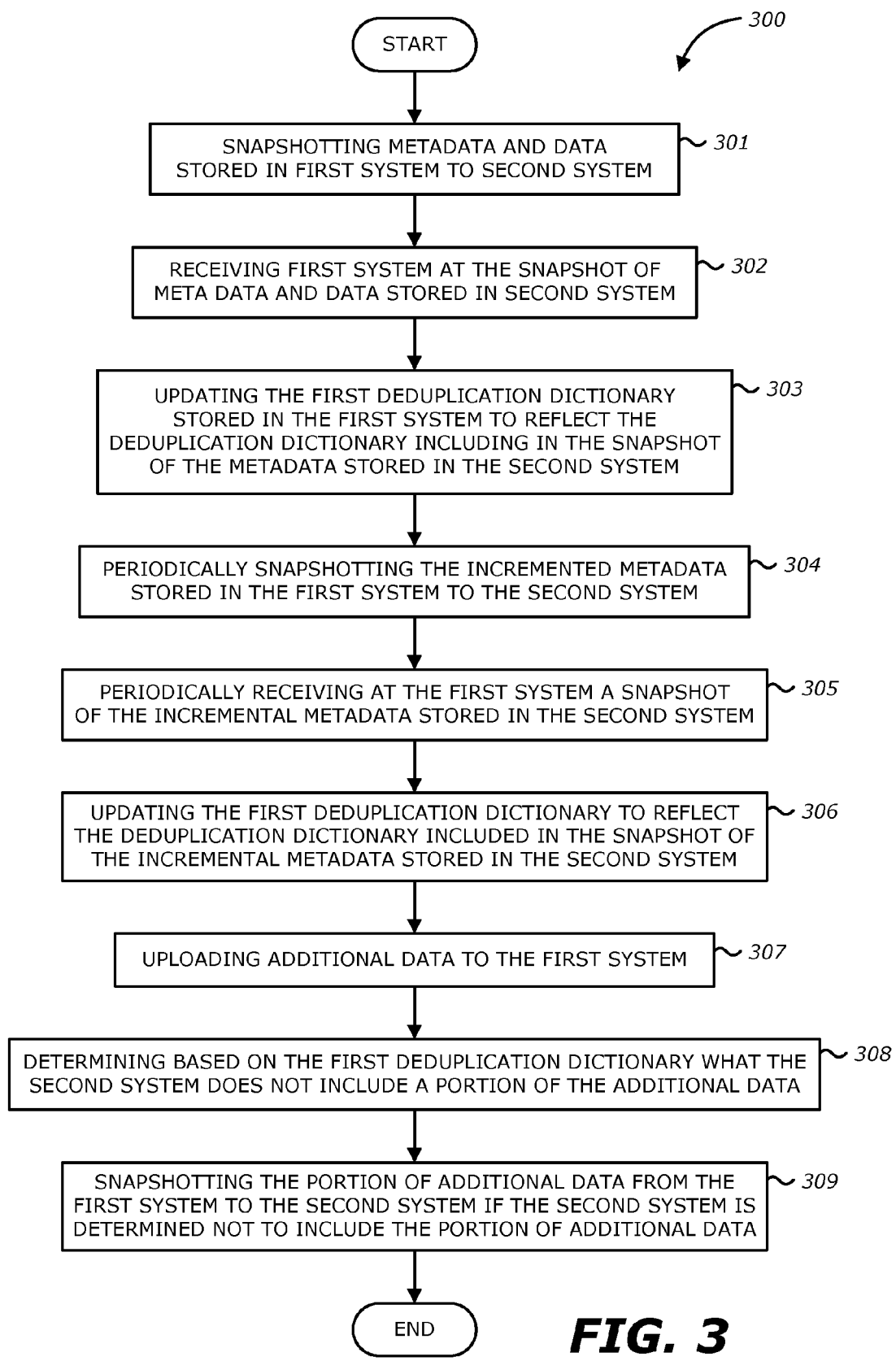
FIG. 3 is an exemplary flowchart of a method in which one embodiment of the invention may be implemented.

FIG. 3 shows an exemplary flowchart of a method 300 in which one embodiment of the invention may be implemented. In this embodiment of the invention, the method 300 of implementing a global deduplication file system between a plurality of interconnected systems including at least a first system and a second system begins, at Block 301, by snapshotting a metadata and a data stored in the first system to the second system. At Block 302, a snapshot of a metadata and a data stored in the second system is also received at the first system. At Block 303, a first deduplication dictionary stored in the first system is updated to reflect a deduplication dictionary included in the snapshot of the metadata stored in second system. The first deduplication dictionary identifies data stored in each of the plurality of interconnected systems. By updating the first dictionary using the snapshot of the metadata stored in second system, the first dictionary is effectively maintained up to date regarding the contents stored in each of the plurality of interconnected systems.

At Block 304, the incremental metadata stored in the first system is periodically snapshot to the second system. Each of the plurality of interconnected systems possesses a deduplication dictionary which is used to ascertain the contents stored in each system. By snapshotting the incremental metadata to the second system, the first system is providing the second system with the changes to the deduplication dictionary and upon receiving the incremental metadata, the second system may update the second deduplication dictionary stored in the second system. In one embodiment, this incremental snapshot is taken every x seconds per configuration to ensure that all data in each of the plurality of interconnected systems is up to date. Similarly, at Block 305, the first system receives a snapshot of incremental metadata stored in the second system and at Block 306, the first deduplication dictionary is further updated to reflect the deduplication dictionary included in the snapshot of the incremental metadata stored in the second system.

In this embodiment, at Block 307, additional data is uploaded to the first system. For example, windows7_with_service_pack1.iso may be uploaded to the system in Tokyo. In this example, the additional data being uploaded to the first system in Tokyo is windows7_with_service_pack1.iso. At Block 308, using the first deduplication dictionary, it is determined whether the second system does not include a portion of additional data. Using the previous example, the first system in Tokyo determines whether the second system in New York includes any portion of windows7_with_service_pack1.iso. If, for example, windows7.iso has previously been uploaded to the system in New York, the system in Tokyo will determine that the service pack 1 is a portion of the additional data that is not stored in the system in New York. At Block 309, the portion of additional data is snapshot from the first system to the second system if the second system is determined not to include the portion of additional data. In our previous example, the system in Tokyo snapshots a snapshot of the service pack 1 to the system in New York. Accordingly, the systems in Tokyo and New York will only interchange the differences being service pack 1 while windows 7 will not be retransmitted.

In other embodiments, the snapshots of data may be uploaded to a cloud storage and downloaded therefrom as discussed above. In this embodiment, upon determining that the service pack 1 is the portion of additional data that has not been previously uploaded to the cloud storage provider by any one of the plurality of systems, the system in Tokyo uploads the service pack 1 to the cloud storage provider to be downloaded from the system in New York.
Part III: Methods for Implementing a Global Deduplication File System that Provides Appropriate Read/Write Locks.

In one embodiment, a global deduplication file system between a plurality of interconnected systems located in different locations globally may be implemented that provides for the appropriate read/write locks.

Figure 4:
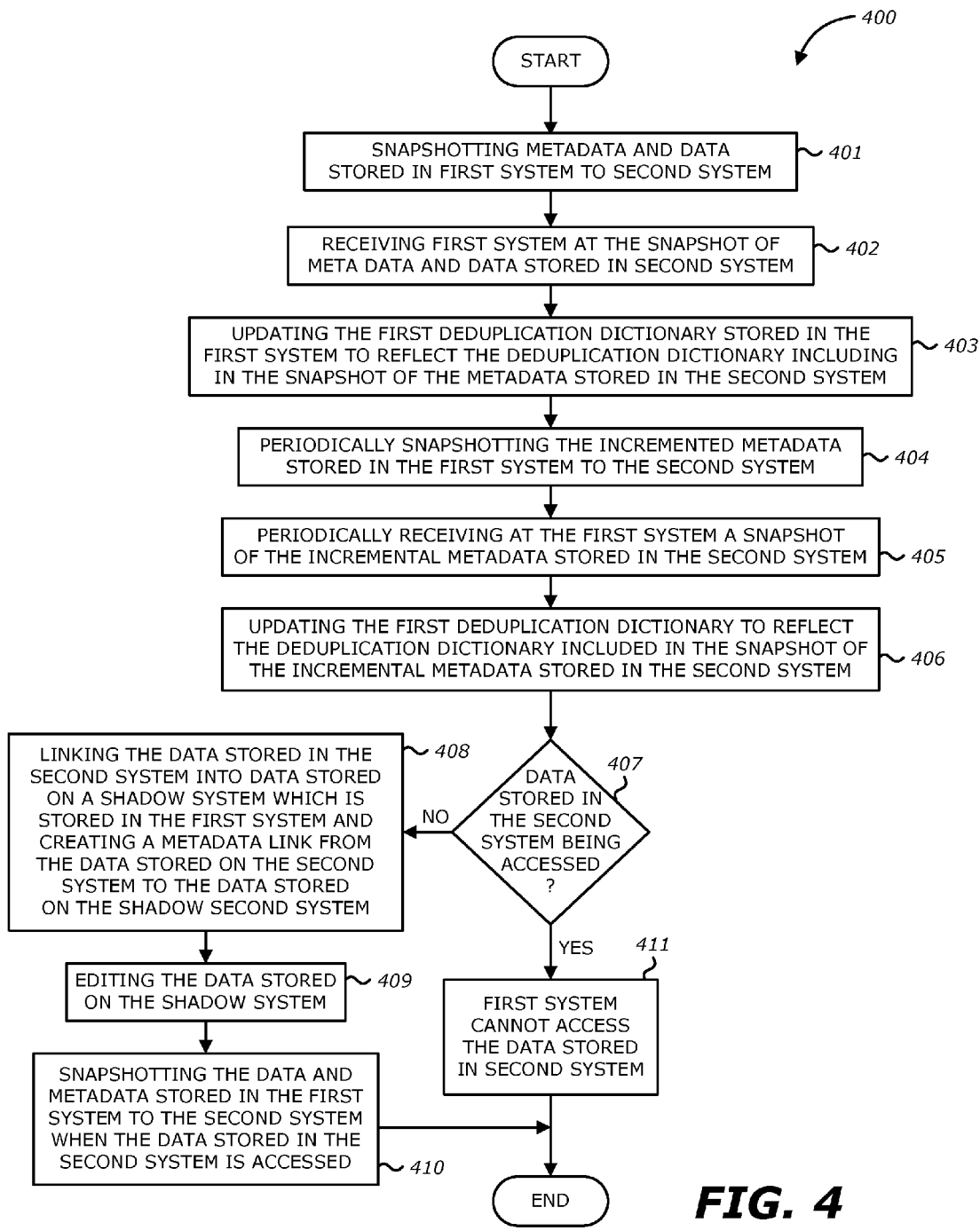
FIG. 4 is an exemplary flowchart of a method in which another embodiment of the invention may be implemented.

FIG. 4 shows an exemplary flowchart of a method 400 in which another embodiment of the invention may be implemented. Similar to method 300, the method 400 implements a global deduplication file system between a plurality of interconnected systems located in different locations globally and including at least a first system and a second system. In this embodiment, method 400 starts with Blocks 401-406 which are similar to Blocks 301-306, as delineated in method 300.

In this embodiment, method 400 begins, at Block 401, by snapshotting a metadata and a data stored in the first system to the second system. At Block 402, a snapshot of a metadata and a data stored in the second system is also received by the first system. The first deduplication dictionary stored in the first system is updated to reflect a deduplication dictionary included in the snapshot of the metadata stored in second system in Block 403. As above, the first deduplication dictionary identifies data stored in each of the plurality of interconnected systems. At Block 404, incremental metadata stored in the first system is periodically snapshot to the second system and at Block 405, the first system periodically receives a snapshot of incremental metadata stored in the second system. At Block 406, the first deduplication dictionary is further updated to reflect the deduplication dictionary included in the snapshot of the incremental metadata stored in the second system.

In this embodiment of the invention, at Block 407, the first system determines whether data stored in the second system is being accessed. For example, if a client is connected to the first system wants to write to file 2 which is stored in the second system (e.g., /System2/file2), the first system checks the second system to determine whether another client is writing to file 2.

If the data stored in the second system is being accessed, at Block 411, the first system cannot access the data stored in the second system. For instance, if a second client is currently editing file 2 on /System2/file2, the file 2 is read/write locked from the first client in order to ensure that the file 2 data provided to the first client is not stale.

If the data stored in the second system is not being accessed, at Block 408, the data stored in the second system is linked into data stored on a shadow system that is stored in the first system. For instance, using the previous example, if file 2 is not being accessed, /System2/file2 is linked back to /System1/_shadowsystem2/file2. The first system will present the file 2 as writable to the client as though the file 2 is located at /System2/file2, but the actual path is /System1/_shadowsystem2/file2. This allows for file 2 to be edited by the client even if connectivity between the first system and the second system were to be disconnected. Additionally, at Block 408, a metadata link is created from the data stored on the second system to the data stored on the shadow second system. In the previous example, the metadata link is created from /System2/file2 to /System1/_shadowsystem2/file2.

At Block 409, the data stored on the shadow system can be edited and the edited data may be saved onto the shadow system. For example, when the client edits and saves the file 2, the first system writes the edited data into /System1/_shadowsystem2/file2. In this embodiment, no other system needs to be consulted for the write operation to be performed because the write is performed locally. Further, in this embodiment, because the first system is writing to a fileserver that is local (i.e., /System1/_shadowsystem2/file2), the write operation is fast and may be performed even if the first system and the second system were to be disconnected.

At Block 410, when the data stored in the second system is accessed, the data and metadata stored in the first system may be incrementally snapshot to the second system. As above, the first system may use first deduplication dictionary to determine which portions of the edited file are not already stored in the second system in order to send only the incremental data. Using the previous example, when another client connected to the second system wants to read /System2/file2, because /System2/file2 points to /System1/_shadowsystem2/file2, the data and metadata stored in the first system that was snapshot to the second system is used to obtain the updated data for file 2. In this embodiment, no other system needs to be consulted in order to perform this operation since the snapshots of metadata stored in the first system are provided incrementally to the second system. In other embodiments, the snapshots of data may be uploaded to a cloud storage and downloaded therefrom as discussed above.

The above embodiments of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, etc.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hard-wired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A method of implementing a global deduplication file system between a plurality of interconnected systems located in different geographic locations, the plurality of interconnected systems including at least a first system and a second system, the method being implemented by at least one computer processor and comprising:

transferring a first snapshot of metadata and data stored in the first system to the second system, wherein the first system includes a first deduplication table that comprises a set of hash values that identify data blocks stored in the first system, wherein the first snapshot includes one or more hash values from the first deduplication table;

receiving at the first system a second snapshot of metadata and data stored in the second system, wherein the second system includes a second deduplication table that comprises a set of hash values that identify data blocks stored in the second system, wherein the second snapshot includes one or more hash values from the second deduplication table;

updating the first deduplication table to reflect the one or more hash values included in the second snapshot, wherein the updated first deduplication table includes the sets of hash values that identify all of the data blocks stored in the plurality of interconnected systems, wherein periodic exchanges of snapshots ensure that each system's deduplication table is updated to include the sets of hash values that identify the data blocks stored in the plurality of interconnected systems;

receiving in the first system additional data from a client device;

determining one or more hash values for the additional data;

determining based on the hash values for the additional data and the first deduplication dictionary table whether the additional data is stored in the plurality of interconnected systems; and transferring a third snapshot of a portion of the additional data from the first system to the second system upon determining from the first deduplication table that the second system does not include the portion of the additional data; wherein the first system comprises a first file system including at least a first virtual device (vdev) that stores the metadata and a second vdev that stores the data, the first vdev being different from the second vdev, and the first system is a lock owner that manages write accesses to the data in the first file system.

2. The method of claim 1, wherein transferring the first snapshot further comprises transferring the first snapshot data to a cloud storage provider.

3. The method of claim 2, wherein receiving the second snapshot at the first system further comprises the first system downloading the first snapshot from the cloud storage provider.

4. The method of claim 2, wherein transferring the third snapshot from the first system to the second system further comprises transferring the third snapshot to the cloud storage provider.

5. The method of claim 1, wherein the data comprises at least one of a file and a file directory, and wherein the metadata comprises a lock ownership indicating whether at least one of the file and the file directory is currently being modified.

6. A system implementing a global deduplication file system comprising:

at least one computer processor;

a plurality of interconnected systems located in different geographic locations, the plurality of interconnected systems including at least a first system and a second system, and utilizing the at least one computer processor for implementing a method comprising:

transferring a first snapshot of metadata and data stored in the first system to the second system, wherein the first system includes a first deduplication table that comprises a set of hash values that identify data blocks stored in the first system, wherein the first snapshot includes one or more hash values from the first deduplication table;

receiving at the first system a second snapshot of metadata and data stored in the second system, wherein the second system includes a second deduplication table that comprises a set of hash values that identify data blocks stored in the second system, wherein the second snapshot includes one or more hash values from the second deduplication table;

updating the first deduplication table to reflect the one or more hash values included in the second snapshot, wherein the updated first deduplication table includes the sets of hash values that identify all of the data blocks stored in the plurality of interconnected systems, wherein periodic exchanges of snapshots ensure that each system's deduplication table is updated to include the sets of hash values that identify the data blocks stored in the plurality of interconnected systems;

receiving in the first system additional data from a client device;

determining one or more hash values for the additional data;

determining based on the hash values for the additional data and the first deduplication dictionary table whether the additional data is stored in the plurality of interconnected systems; and transferring a third snapshot of a portion of the additional data from the first system to the second system upon determining from the first deduplication table that the second system does not include the portion of the additional data; wherein each of the plurality of interconnected systems comprises a file system including at least a first virtual device (vdev) that stores corresponding metadata and a second vdev that stores corresponding data, the first vdev being different from the second vdev, and each of the plurality of interconnected systems is a lock owner that manages write accesses to the corresponding data of the file system included therein.

7. The system of claim 6, further comprising a cloud storage provider, wherein the snapshots containing the data blocks and the portion of the additional data are transferred to the cloud storage provider.

8. The system of claim 7, wherein each of the plurality of interconnected systems downloads snapshots of the transferred data from the cloud storage provider.

9. The system of claim 7, wherein one of the other plurality of interconnected systems that does not include the portion of the additional data downloads the snapshot of the portion of the additional data from the cloud storage.

10. The system of claim 6, wherein the data comprises at least one of a file and a file directory, and wherein the metadata comprises a lock ownership indicating whether at least one of the file and the file directory is currently being modified.

11. A method of implementing a global deduplication file system between a plurality of interconnected systems located in different geographic locations, the plurality of interconnected systems including at least a first system and a second system, the method being implemented by at least a computer processor and comprising:

transferring a first snapshot of metadata and data stored in the first system to the second system, wherein the first system includes a first deduplication table that comprises a set of hash values that identify data blocks stored in the first system, wherein the first snapshot includes one or more hash values from the first deduplication table;

receiving at the first system a second snapshot of metadata and data stored in the second system, wherein the second system includes a second deduplication table that comprises a set of hash values that identify data blocks stored in the second system, wherein the second snapshot includes one or more hash values from the second deduplication table;

updating the first deduplication table to reflect the one or more hash values included in the second snapshot, wherein the updated first deduplication table includes the sets of hash values that identify all of the data blocks stored in the plurality of interconnected systems, wherein periodic exchanges of snapshots ensure that each system's deduplication table is updated to include the sets of hash values that identify the data blocks stored in the plurality of interconnected systems;

receiving a request from a client device to modify a data file managed by the second system;

determining that the data file system is not being accessed, wherein when the data file is not being accessed, the data file is not being locked by the second system;

creating on the first system a shadow data file for the data file, wherein the shadow data file is a copy of the data file;

updating the metadata on the second system so that accesses to the data file on the second system are redirected to the shadow data file on the first system;

editing the shadow data file on the first system in response to the modifying request, wherein the second system does not need to be consulted for the editing because any write operation for the shadow data file is performed locally to the first system; and during a subsequent snapshot operation, using the first deduplication table to determine that portions of the edited shadow data file are not stored in the second system, and sending an incremental snapshot to update the data file on the second system;

wherein creating the shadow data file and updating the metadata on the second system to point to the shadow data file on the first system allows the data file to be modified on the first system even when network connectivity between the first system and the second system is disconnected; wherein the first system comprises a first file system including at least a first virtual device (vdev) that stores the metadata of the first system and a second vdev that stores the data of the first system, the first vdev being different from the second vdev, and the first system is a lock owner that manages write accesses to the data in the first file system.

12. The method of claim 11, wherein transferring the first snapshot further comprises transferring the first snapshot to a cloud storage provider.

13. The method of claim 12, wherein receiving the second snapshot at the first system further comprises the first system downloading the first snapshot from the cloud storage provider.

14. The method of claim 12, wherein sending the incremental snapshot to update the data file on the second system further comprises:

sending the incremental snapshot to the second system when the data file is accessed in the second system; and sending the incremental snapshot to the cloud storage provider.

15. The method of claim 11, wherein in the first and second systems, the data comprises at least one of a file and a file directory, and wherein the metadata comprises a lock ownership indicating whether at least one of the file and the file directory is currently being modified.

* * * * *